(12) United States Patent
Felk et al.

(10) Patent No.: US 7,597,776 B2
(45) Date of Patent: Oct. 6, 2009

(54) SEAL TOOL FOR FILM-SEALING MACHINE

(75) Inventors: Günther Felk, Ulm-Einsingen (DE); Wolfgang Krahl, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 167 days.

(21) Appl. No.: 11/801,733

(22) Filed: May 10, 2007

(65) Prior Publication Data

US 2007/0262067 A1    Nov. 15, 2007

(30) Foreign Application Priority Data

May 11, 2006    (DE) ................. 10 2006 022 264

(51) Int. Cl.
*B32B 37/00* (2006.01)
(52) U.S. Cl. .................... 156/583.1; 156/580
(58) Field of Classification Search ............... 156/228, 156/580, 581, 583.1, 583.4
See application file for complete search history.

(56) References Cited

U.S. PATENT DOCUMENTS 6,190,488 B1 *   2/2001   Tada et al. ................. 156/228

| | | | |
|---|---|---|---|
| 2004/0150135 A1 | 8/2004 | Hennessey et al. | 264/293 |
| 2004/0250135 A1 | 12/2004 | Haddad | 713/201 |
| 2006/0081609 A1 | 4/2006 | Bentele | 219/521 |

FOREIGN PATENT DOCUMENTS

| DE | 2228094 | 6/1972 |
|---|---|---|
| DE | 2228094 | 12/1972 |
| DE | 2228 094 | 12/1973 |
| GB | 643219 | 7/1949 |
| GB | 643219 | 9/1950 |
| JP | 61072524 | 4/1986 |

\* cited by examiner

*Primary Examiner*—James Sells
(74) *Attorney, Agent, or Firm*—Andrew Wilford

(57) ABSTRACT

A sealing tool for a sealing machine has a heat-conductive and normally heated support plate having an inner face and a heat-conductive seal plate having an outer face bearing in surface contact on the support-plate inner face. A central attachment extends between the plates across the faces at a point location and substantially prevents relative movement of the plates parallel to the faces at this point location. Outer attachments spaced outward from the central attachment press the faces together with a limited force such that the faces can slide parallel to each other at the outer attachments.

16 Claims, 3 Drawing Sheets

SEAL TOOL FOR FILM-SEALING MACHINE

FIELD OF THE INVENTION

The present invention relates to a sealing machine. More particularly this invention concerns a plate used in such a machine to seal together a pair of thermoplastic films or sheets.

BACKGROUND OF THE INVENTION

A sealing machine typically has two seal tools at lest one of which is heated. In a standard application a lower thermoplastic film formed with an array of blisters each holding a respective small object is advanced along with a planar upper thermoplastic film between a pair of vertically spaced such seal tools. The lower plate has a planar upper face formed with an array of pockets corresponding to the blisters of the lower film, which is oriented so that the blisters are aligned with and can drop without contact into the pockets when the plates are pressed together. The upper plate has a lower face that can be a smooth continuous plane or also formed with an array of recesses so that it at least engages pinches the two films together with the lower plate in webs extending around the blisters, so as to hermetically close the blisters and encapsulate the objects therein. One standard application of this system is the manufacture of blister packs of pills. Alternately the two plates can be used simply to form the blisters in a single film.

As described in US 2006/0081609 of J. Bentele, the seal tool is formed of a three-layer laminate. The thick core layer is made of aluminum and is provided with heating passages through which a hot liquid is circulated or that are fitted with rod heaters. To each side is a hard steel plate, with an array of bolts extending between the outer plates to lock the three plates together into a rigid assembly. One of the outer steel plates serves as the seal face of the assembly. The other plate is provided to prevent differential thermal expansion of the aluminum and steel from deforming the seal tool.

Such an assembly is fairly expensive and, even when meticulously made, can deform somewhat. Any nonplanarity can result in regions of the two films being sealed that are either burnt through or not sealed together at all. Either way the result is a package reject that is unacceptable, especially when the system is used for an expensive medicament.

OBJECTS OF THE INVENTION

It is therefore an object of the present invention to provide an improved seal tool for film-sealing machine.

Another object is the provision of such an improved seal tool for film-sealing machine that overcomes the above-given disadvantages, in particular that is of simple and inexpensive construction, yet that maintains perfect planarity even when heated.

SUMMARY OF THE INVENTION

A sealing tool for a sealing machine has according to the invention a heat-conductive and normally heated support plate having an inner face and a heat-conductive seal plate having an outer face bearing in surface contact on the support-plate inner face. A central attachment extends between the plates across the faces at a point location and substantially prevents relative movement of the plates parallel to the faces at this point location. Outer attachments spaced outward from the central attachment press the faces together with a limited force such that the faces can slide parallel to each other at the outer attachments.

Thus with the sealing tool according to the invention the contact force of the seal plate tool on the support plate is located at a predetermined interval, and is necessarily specified by the connection of the seal plate to the support plate.

This sealing tool has the advantage that for its manufacture only two parts are necessary, which in addition may be produced independently of one another. This results in a much lower weight of the individual tool. A further advantage is that for this sealing tool the heat expansion of the seal plate and support plate respective with its temperature is unhindered. Because of the design, no thermal stresses can be generated within the sealing tool due to a "soft" connection provided by a contact force for the support plate and the seal plate that is determined by the design. Deformation of the sealing tool, which impairs the sealing quality, is thus avoided in a simple manner. A further advantage is that the seal plate is uniformly heated (or cooled in the case of the bottom seal tool) by the support plate due to a defined contact with the support plate, which further improves the sealing pattern. Furthermore, precise alignment of the oppositely situated sealing tools in a sealing machine is greatly simplified.

To avoid shear motions resulting from forces which exceed the frictional forces between the plates, the seal plate is aligned on the support plate by means of a one-point attachment. This "point location" of the central attachment is intended to mean fixing of the two plates at region that, while not strictly a "point" in the true geometric sense of the term, is in fact of very small dimensions compared to the areas of the plates and in fact forms only a tiny portion of such areas.

Also within the scope of the invention, the support plate and the seal plate are mutually pressed together with a predetermined contact force by means of the at least two outer attachments formed by removable screws whose screw heads bear on the side of the support plate facing away from the films via an elastic part or spring. The shafts of the screws are of a cylindrical shape with a diameter that is smaller than the bore in the support plate and on their free ends have a threaded region that fits in a threaded hole in the seal plate. This has the advantage that the contact force of the seal plate on the support plate may be easily set by the elastic force of the elastic part, and at the same the seal plate and the support plate may thermally expand unhindered and independently of one another. It is also possible to easily replace the seal plate in the event of a format change or because of wear.

According to one preferred embodiment, the elastic part comprises a compression spring and/or an elastomer. Depending on the characteristics of the elastic part, an interval for the contact force by which the seal plate is contacted against the support plate may be specified.

In one refinement of the invention, the screws have a cylindrical section with a larger diameter than the threaded section, and the length of the cylindrical section exceeds the thickness of the support plate. This design prevents overtightening the screws in the respective threaded hole and thus avoids full compression of the elastic parts, so that in the force-transmission chain the screw head acts directly on the support plate in a nonelastic manner, thereby improving the function of the elastic part.

In one preferred embodiment of the invention, the one-point attachment is achieved by a pin or bolt provided in the center of the surface of the seal plate or support plate facing the respective other plate and engaging tightly in a recess on the side of the other plate opposite from the pin or bolt. This has the advantage that the seal plate may be reproducibly, easily, and quickly aligned on the support plate. A defined alignment of the two plates with respect to one another is made possible when the seal plate is appropriately aligned on the corresponding support plate.

In one preferred embodiment of the invention, at least one pin or bolt is provided eccentrically on the surface of the seal plate or support plate facing the respective other plate, the pin or bolt engaging with a slotted hole on the side of the other plate opposite from the pin or bolt. In this manner the alignment of the seal plate on the support plate may be further simplified, thereby ensuring unhindered thermal expansion of the seal plate and the support plate.

It is particularly preferred for the support slate to be made of a material having high thermal conductivity. This ensures that the support plate, with low thermal inertia, has the same temperature at all points, and also that the temperature of the respective seal plate is quickly and uniformly controlled. It is practical for the support plate to be made of aluminum or an aluminum alloy. This part may thus be economically manufactured, and in addition the weight of the sealing tool may be greatly reduced, thereby improving its ease of handling.

It is also particularly advantageous for the seal plate, which is subjected to high thermal and mechanical stresses, to be made of a material having high wear resistance. This prolongs the maximum operating life of this part and thus represents a cost advantage. Fabrication of the seal plate from steel provides extremely high wear resistance due to the possibility for hardening and surface finishing it. The sufficiently high thermal conductivity of this material also allows its temperature to be quickly and uniformly controlled during operation.

In one preferred embodiment of the invention, recesses or holes are formed in the support plate parallel to its faces. This allows heating cartridges, temperature-controlled liquids, or the like to be introduced for quick and uniform temperature control of the support plate.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
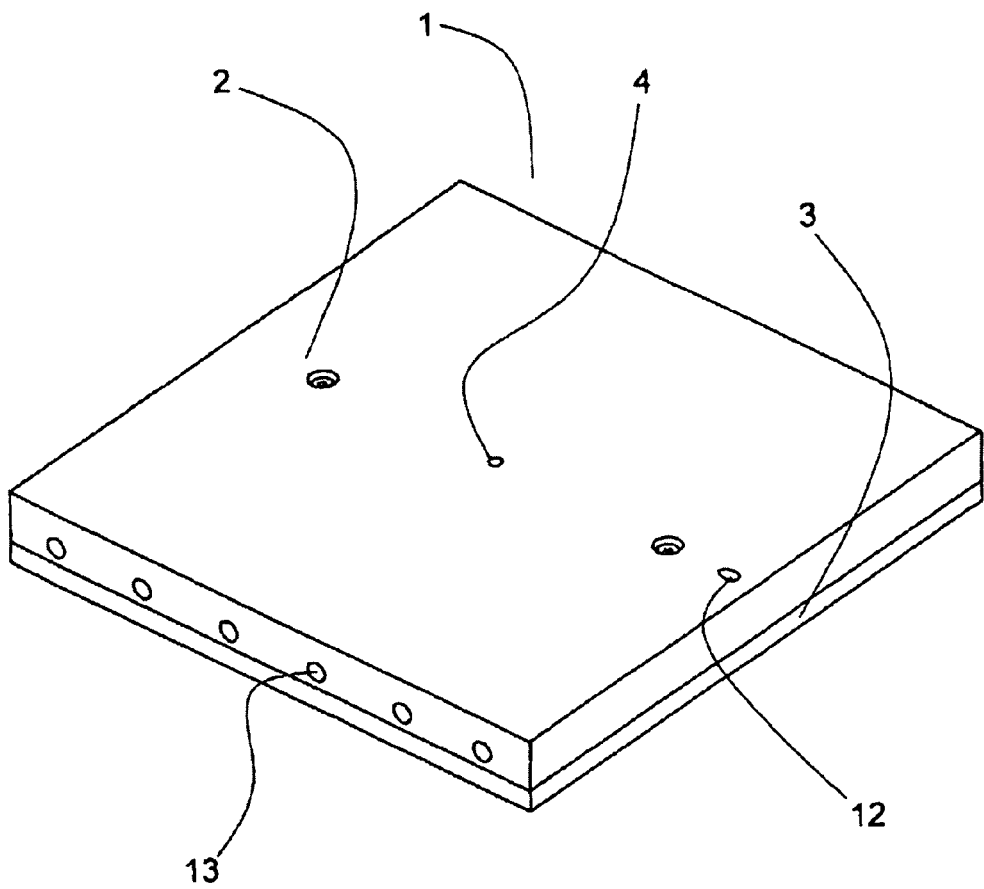
FIG. 1 a perspective view of an upper seal tool according to the invention.
Figure 4:
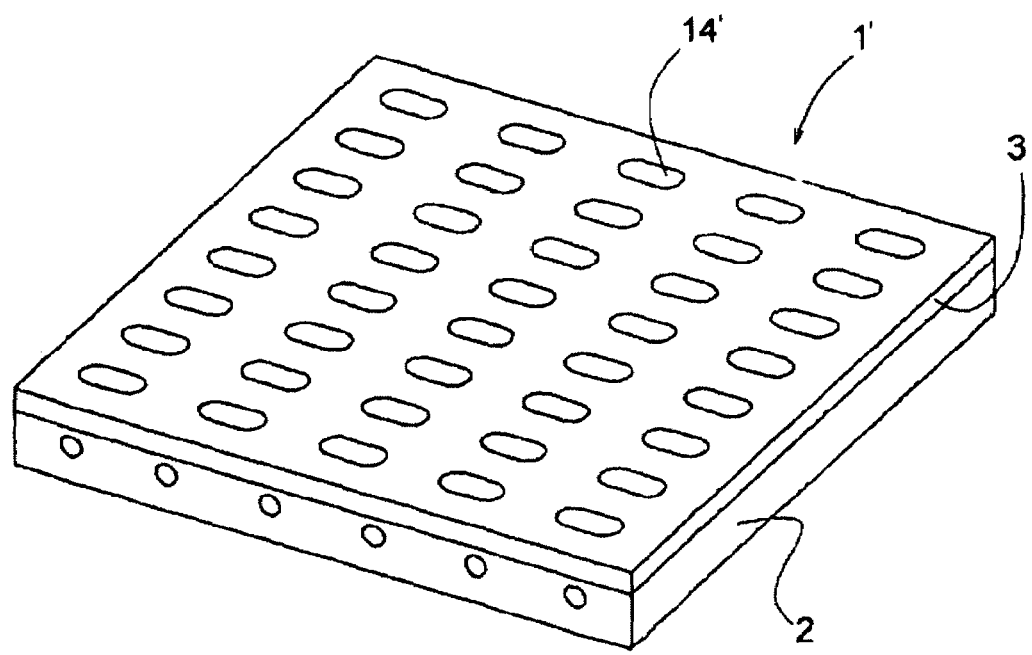
FIG. 4 is a perspective view of a lower seal tool according to the invention.
Figure 5:
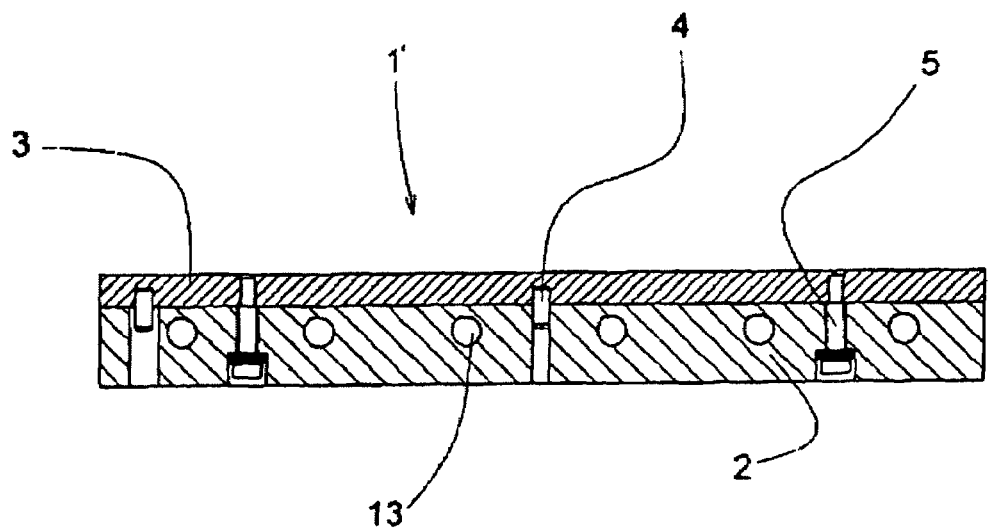
FIG. 5 is a cross section through the plate of FIG. 4.

As seen in FIG. 1 an upper sealing tool 1 is provided for the sealing of films by paired cooperation with a lower sealing tool 1' (FIGS. 4 and 5) in a sealing machine, in particular in a thermoforming machine. Each sealing tool 1 and 1' has a temperature-controlled support plate 2 and a seal plate 3 which is aligned with the support plate 2 on the inner side facing the unillustrated films by means of at least one central one-point attachment 4. The support plate 2 and the seal plate 3 are brought into mutual contact by a predetermined elastic force. This two-layer structure of a sealing tool 1 ensures simple manufacture of the individual parts and easy assembly. The advantage of the seal plate 3 and support plate 2 being mutually contacted by an elastic force is that the thermal expansion of the individual parts associated with the heating or cooling of the sealing tool 1 may proceed in an unhindered manner, and thermal stresses cannot be generated within the sealing tool 1. As a result, the generation of undesired waviness of the plate 3 surface facing the film as well as flexion or twisting of the sealing tool 1 are suppressed. This increases the sealing quality and the uniformity of the sealing pattern. The one-point attachment 4 of the seal tool 1 on the support plate 2 also enables the seal plate 3 to be precisely aligned on the support plate 2, thus allowing a mirror-image configuration of the seal plate 3 with respect to the seal plate 3 of the functionally complementary second sealing tool in the sealing machine.

Figure 2:
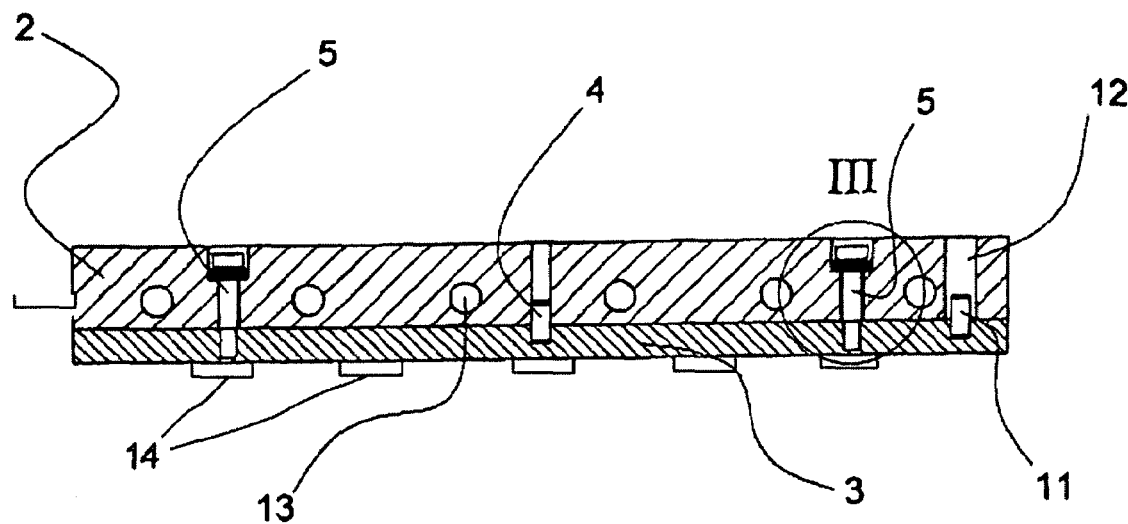
FIG. 2 is a cross section through the plate of FIG. 1.
Figure 3:
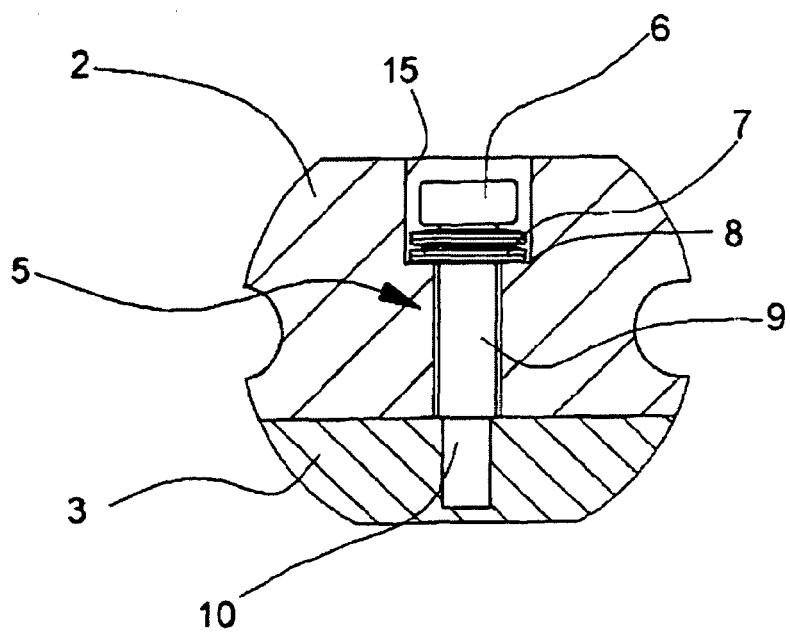
FIG. 3 is a large-scale view-of the detail indicated at III in FIG. 2.

As seen in particular in FIGS. 2 and 3, in the illustrated embodiment represented here the support plate 2 and seal plate 3 are brought into mutual contact by means of two removable screws 5, that, of course, may be supplemented by additional screws if necessary. The screw head 6 is supported on a shoulder 8 of a larger prebored hole 15 by insertion of an elastic part 7, namely, a spring washer, on the side of the support plate 2 facing away from the films, and the screw shaft has a cylindrical section 9 with a diameter that is smaller than the bore in the support plate 2 and on its free end has a threaded section 10 that engages with a threaded hole in the seal plate 3. The contact force with which the seal plate 3 is pressed against the support plate 2 is thus determined by the elastic part 7, which is placed under pretension by screwing in the screw 5. The advantage is that the seal plate 3 uniformly contacts the support plate 2, thus allowing the temperature of the seal plate 3 to be uniformly controlled by the heat-controlled support plate 2. Furthermore, introduction of the elastic part 7 and the play that is present in the cylindrical section 9 in the respective bore in the support plate 2 allow unhindered thermal expansion of the individual parts, thereby avoiding generation of thermal stresses within the sealing tool 1. According to one suitable refinement of the invention, the elastic part 7 may also be formed from an elastomer, such as a rubber bushing or the like.

A further particularly preferred embodiment is characterized in that the screws 5 each have a cylindrical section 9 with a diameter that is larger than the respective threaded section 10, and the length of the cylindrical section 9 is specified as a function of the thickness of the support plate 2. This feature prevents overtightening the screw 5 in the respective threaded hole in the seal plate 3, thus avoiding complete fixing of the elastic part 7 and the associated loss of function of this part.

As shown in particular in FIG. 2, in the illustrated embodiment represented here the one-point attachment 4 is achieved by a pin 4, provided in the center of the outer face of the seal plate 3 and extending through the support plate 3 at its center. This pin 4 fits tightly on both sides. This one-point attachment 4 may be provided by a bolt, screw, or the like. As shown in this illustrated embodiment, an additional pin 11 is provided eccentrically on the surface of the seal plate 3 facing the respective other plate, the pin 11 engaged in a slot 12 on the side of the support plate 2 opposite from the pin 11. This additional pin 11 enables the seal plate 3 to be precisely positioned on the support plate 2, thus allowing a corresponding alignment with the seal plate 3 of the other sealing tool 1 before the screws 5 are threaded home.

According to the invention it is particularly preferable for the support plate 2 to be made of a material having high thermal conductivity, such as aluminum or an aluminum alloy. This allows the temperature of the entire support plate 2 to be quickly and uniformly controlled, and in a manner specified by the design allows comparable temperature control of the seal plate 3. According to the invention, this seal plate 3 is made of a material having high wear resistance, such as steel. It is possible to achieve an extremely long service life by hardening and further finishing it, thus drastically lowering the operating costs.

As shown in particular in FIG. 2, recesses or holes 13 are provided parallel to the surface in the support plate 2 that allow heating cartridges, liquids, and the like to be introduced for controlling the temperature of the support plate 2. According to the invention, the seal plate 3 of the tool 1 has on its inner face an array of bumps 14 and the seal plate 3 of the tool 1 a complementary array of recesses 14' on its inner face. Since it is specifically these formation 14 and 14' that are exposed to high mechanical and thermal stresses, for repairing the sealing tool 1 it is particularly advantageous that the seal plate 3 may be replaced separately from the support plate 2.

We claim:

1. A sealing tool for a sealing machine, the tool comprising:
   a heat-conductive support plate having an inner face;
   a heat-conductive seal plate having an outer face bearing in surface contact on the support-plate inner face;
   means for heating the support plate directly for heating the seal plate through the support plate;
   a central attachment extending between the plates across the faces at a point location and substantially preventing relative movement of the plates parallel to the faces at the point location, the support plate being formed with two throughgoing bores of predetermined diameter opening at the inner face and spaced outward from the central attachment, the seal plate being formed with two threaded bores each aligned with a respective one of the outer bores;
   means for heating the support plate;
   two outer bolts each having
      a threaded outer end threaded into a respective one of the threaded bores of the seal plate,
      an unthreaded shank of smaller diameter than and fitting with play in the respective bore of the support plate, and
      a head spacedly juxtaposed with an outwardly directed surface of the support plate, and
   respective elastic parts each compressed between a respective one of the heads and the respective outwardly directed surface of the support plate and pressing the faces together with a limited force such that the faces can slide parallel to each other at the outer bolts.

2. The sealing tool defined in claim 1 wherein the support plate and seal plate have substantially different coefficients of thermal expansion and the faces are substantially planar, whereby, when the support plate is directly heated and the seal plate is indirectly heated by the seal means, the faces of the plates slide on each other at the outer bolts while remaining in surface contact.

3. The sealing tool defined in claim 2 wherein the support plate is aluminum and the seal plate is steel.

4. The sealing tool defined in claim 2 wherein the seal plate has an inner face turned away from the support plate and formed with an array of formations.

5. The sealing tool defined in claim 4 wherein the formations are bumps or recesses.

6. The sealing tool defined in claim 1 wherein each elastic part is a spring engaged between the respective head and the surface of the support plate.

7. The sealing tool defined in claim 1 wherein each bore is a counterbore with an outwardly directed shoulder forming the surface on which bears the respective elastic part.

8. The sealing tool defined in claim 7 wherein each shank extends from the respective threaded outer end to the respective head and has a length equal to more than a distance from the respective shoulder to the seal-plate inner face.

9. The sealing tool defined in claim 5 wherein each bore is a slot extending away from the center attachment.

10. The sealing tool defined in claim 1 wherein the central attachment is substantially centrally located in the plates.

11. The sealing tool defined in claim 10 wherein the outer bolts symmetrically flank the central attachment.

12. The sealing tool defined in claim 11 wherein there are only two of the outer bolts.

13. The sealing tool defined in claim 1 wherein the central attachment is a pin fitted tightly into aligned central bores in the support and seal plates.

14. The sealing tool defined in claim 13 wherein the central bore of the seal plate is blind.

15. The sealing tool defined in claim 1 wherein the faces are planar.

16. The sealing tool defined in claim 1, further comprising at least one attachment offset from the central attachment and engaging across the faces, seated at one side of the faces tightly in a recess and at the other side of the faces in a slot extending in line with the central attachment.

* * * * *